United States Patent [19]

Taylor

[11] Patent Number: 5,950,280

[45] Date of Patent: Sep. 14, 1999

[54] UTENSIL HOLDING DEVICE

[75] Inventor: Curtis Taylor, Chagrin Falls, Ohio

[73] Assignee: Magic American Corporation, Cleveland, Ohio

[21] Appl. No.: 08/909,198

[22] Filed: Aug. 11, 1997

[51] Int. Cl.[6] .................................................. A47J 45/07
[52] U.S. Cl. .................................. 16/114 R; 16/DIG. 18; 16/111 R; 30/323; 30/324; 30/342
[58] Field of Search ............................ 30/123, 323, 324, 30/340, 342; 81/177.2; 220/752, 753, 755; 16/114 R, 116 R, DIG. 12; 15/143.1, 145

[56] References Cited

U.S. PATENT DOCUMENTS

| | | | |
|---|---|---|---|
| 1,376,126 | 4/1921 | Willett | 220/755 |
| 2,719,995 | 10/1955 | Hohenstein | 15/145 |
| 3,072,955 | 1/1963 | Mitchell | 16/116 R |
| 3,212,123 | 10/1965 | Southcott et al. | 16/114 R |
| 3,635,382 | 1/1972 | Wilson | 16/DIG. 12 |
| 4,791,701 | 12/1988 | Dutchburn | 16/116 R |
| 4,811,637 | 3/1989 | McCleary | 16/116 R |
| 5,060,386 | 10/1991 | Mars | 30/324 |
| 5,251,380 | 10/1993 | Craig | 16/110 R |
| 5,664,520 | 9/1997 | Latimer, III | 16/116 R |

*Primary Examiner*—Chuck Y. Mah
*Assistant Examiner*—Donald M. Gurley
*Attorney, Agent, or Firm*—David J. Untener; Teresan W. Gilbert

[57] ABSTRACT

A utensil holding device engageable with a utensil (e.g., spoon or fork) to provide an improved gripping surface for the utensil. The utensil holding device is adapted for quick and easy attachment to a utensil. A portion of the handle section of a utensil is arranged inside a cavity formed by the utensil holding device. The device allows an individual to better grip and maneuver a utensil.

4 Claims, 4 Drawing Sheets

UTENSIL HOLDING DEVICE

FIELD OF INVENTION

The present invention generally relates to a device for holding a utensil, and more particularly relates to a device adapted to receive a portion of a utensil and provide an improved gripping surface for manipulating the utensil.

BACKGROUND OF THE INVENTION

We rely on our hands to carry out numerous daily routine tasks. However, our ability to carry out these tasks can be impaired due to physcial inactivity, aging, or as the result of an injury. For instance, extended periods of physical inactivity can lead to gradual loss of muscle strength. Arthritis also strikes many people in older age, and can cause difficulties using the hands. In addition, people who suffer a stroke may have great difficulty controlling hand movement. Moreover, people young and old may suffer temporary or permanent impairment due to an injury. The entire medical field of occupational therapy (OT) is directed to helping individuals adapt to impaired physical conditions, including impairment to the hands.

One activity which can be difficult for individuals suffering from loss of muscle strength, arthritis, a stoke, an injury or other impairment to the hands, is manipulating a utensil, such as a spoon or fork. Such an activity provides difficulties due to the small gripping surface provided by most utensils. Accordingly, there is a need for a device which allows an individual to better grip and maneuver a utensil.

SUMMARY OF THE INVENTION

According to the present invention there is provided a utensil holding device which is adapted to engage with the handle portion of a utensil to provide an enlarged gripping surface for handling the utensil.

An advantage of the present invention is the provision of a utensil holding device which improves an individual's grip on a utensil.

Another advantage of the present invention is the provision of a utensil holding device which provides an enlarged surface area for gripping a utensil.

Still another advantage of the present invention is the provision of a utensil holding device which is ergonomically designed to reduce tension in the hand.

Yet another advantage of the present invention is the provision of a utensil holding device which is easily attachable to and detachable from a utensil, such as a spoon or fork.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
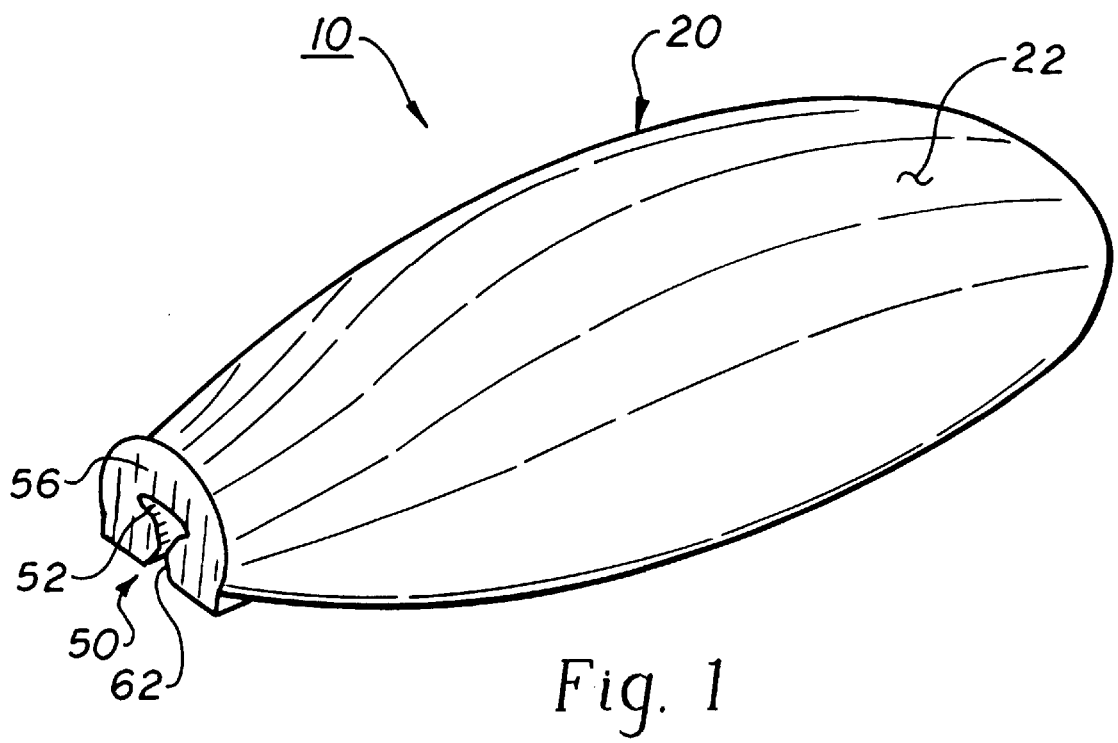
FIG. 1 is a top perspective view of a utensil holding device according to a preferred embodiment of the present.
Figure 2:
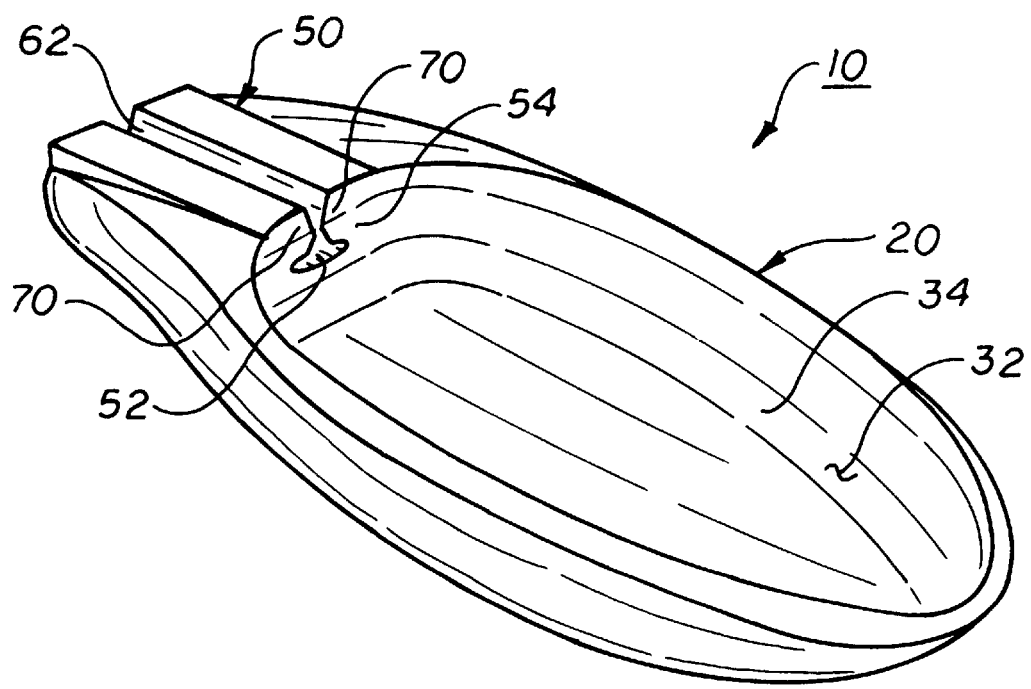
FIG. 2 is a bottom perspective view the utensil holding device shown in FIG. 1.
Figure 3:
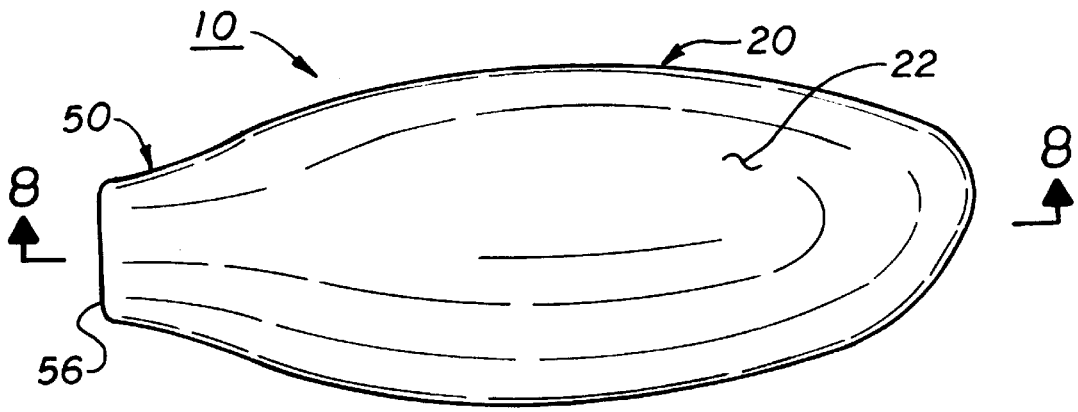
FIG. 3 is a top plan view of the utensil holding device.
Figure 4:
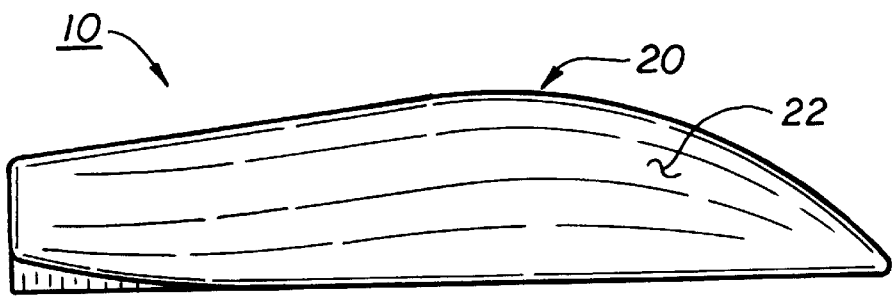
FIG. 4 is a side plan view of the utensil holding device.
Figure 5:
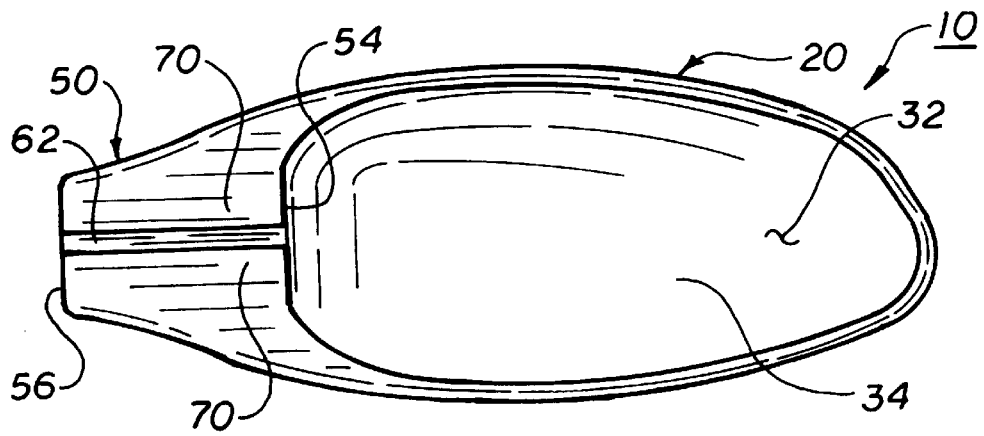
FIG. 5 is a bottom plan view of the utensil holding device.
Figure 7:
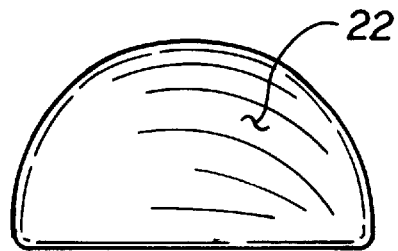
FIG. 7 is a rear end view of the utensil holding device.
Figure 8:
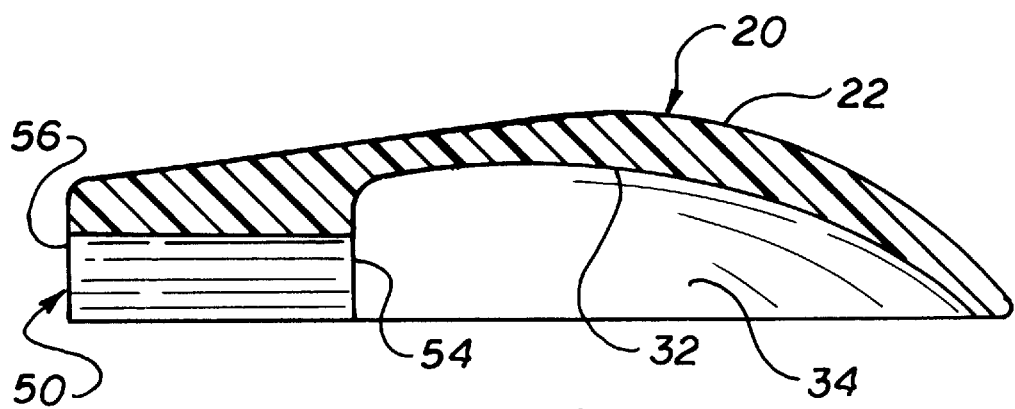
FIG. 8 is a cross-sectional view of the utensil holding device, taken along line 8—8 of FIG. 3.

Referring now to the drawings wherein the showings are for the purposes of illustrating a preferred embodiment of the invention only and not for purposes of limiting same, FIGS. 1 and 2 show perspective views of utensil holding device 10. FIG. 1 shows a top perspective view, while FIG. 2 shows a bottom perspective view. Utensil holding device 10 is generally comprised of a handle portion 20 and an attachment portion 50. Handle portion 20 includes a generally convex outer surface 22 (FIGS. 1, 6 and 7) and a generally concave inner surface 32 (FIGS. 2 and 5). Concave inner surface 32 defines a cavity 34 (FIGS. 2, 5 and 8). Cavity 34 is dimensioned to receive the handle of a utensil, as will be explained below.

Figure 6:
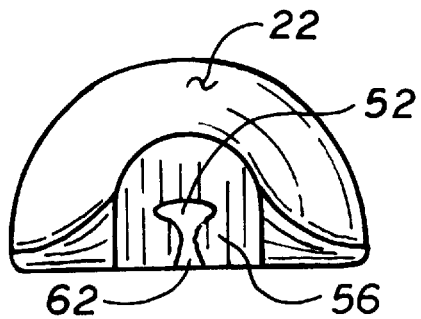
FIG. 6 is a front end view of the utensil holding device.

Attachment portion 50 is provided to attach utensil holding device 10 to a utensil U. Attachment portion 50 includes an elongated channel 52 and an elongated vertical slot 62, which are best seen in FIGS. 1,2 and 6. Channel 52 extends from an inner edge 54 to an outer edge 56. Moreover, channel 52 is tapered from inner edge 54 to outer edge 56. Accordingly, channel 52 widens from outer edge 56 to inner edge 54. Vertical slot 62 intersects channel 52 and extends generally parallel thereto. Channel 52 and slot 62 define gripping members 70 (FIG. 5) for engaging with utensil U.

Vertical slot 62 allows the handle stem of a utensil to be inserted into and removed from channel 52 by turning the utensil handle on edge and either pushing the utensil handle through slot 62 or pulling the utensil handle out through slot 62. When the edge of the utensil handle stem is inserted through slot 62 to channel 52, the utensil handle is turned so that it is lined up with channel 52 and then pulled upward until the utensil handle is locked in place in channel 52. Operation of utensil holding device 10 is described in detail below.

It should be appreciated that utensil holding device 10 is preferably formed of a thermoplasticelastomer (TPE) material. TPE is preferred since it can withstand the temperatures encountered in an automatic dishwasher. Accordingly, utensil holding device 10 can remain attached to a utensil for extended periods of time, including periods of dishwashing in an automatic dishwasher. Moreover, it should be noted that TPE provides some elasticity.

Figure 9:
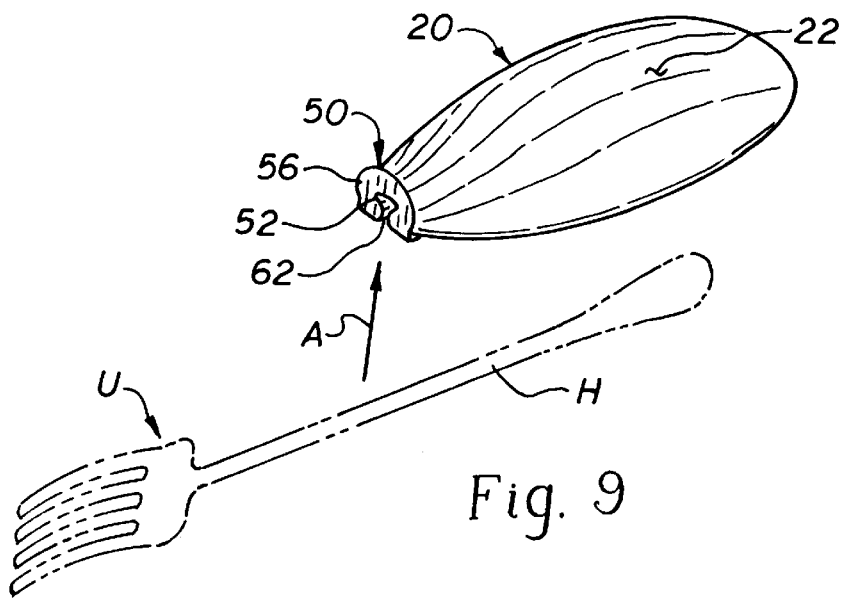
FIG. 9 is a front perspective view of the present invention, as arranged for attachment to a utensil.
Figure 10:
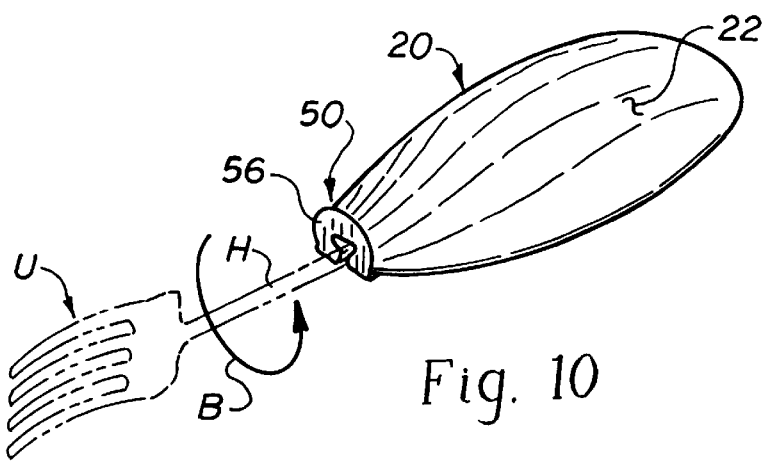
FIG. 10 is a front perspective view of the present invention, as partially attached to the utensil.
Figure 11:
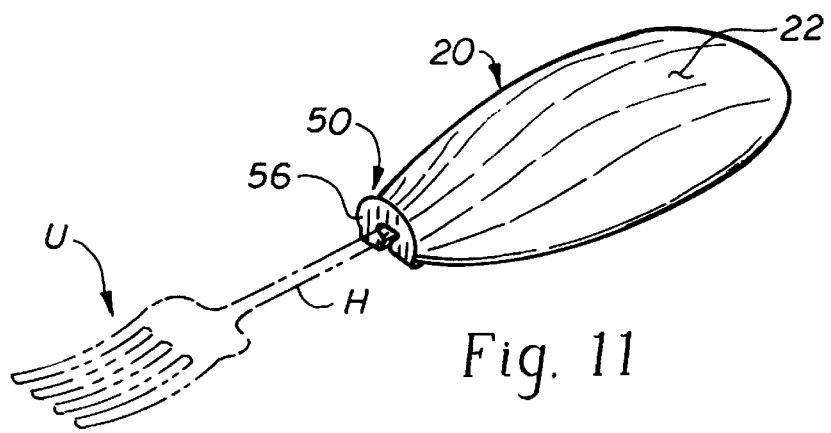
FIG. 11 is a front perspective view of the present invention, as fully attached to the utensil.

The operation of utensil holding device 10 will now be described with reference to FIGS. 9–11. FIG. 9 shows the orientation of utensil holding device 10 relative to utensil U just prior to attachment; FIG. 10 shows the orientation of utensil holding device 10 relative to utensil U during the process of attachment; and FIG. 11 shows utensil holding device 10 fully attached to utensil U, in condition for operation of utensil U.

A typical utensil U has an elongated handle stem portion H. This handle portion H has a flat blade-like shape. To attach utensil U to holding device 10, utensil U is aligned with holding device 10, such that the narrow edge of handle portion H is facing into slot 62, as shown in FIG. 9. Next, handle portion H is inserted into slot 62 by moving utensil U in the direction of arrow A. It should be understood that utensil U is preferably inserted into slot 62 at the narrowest neck point thereof Utensil U is then rotated 90 degrees (e.g., in the direction of arrow B) such that the handle portion H is inserted into channel 52. Thereafter, holding device 10 is slid upwards relative to the utensil handle towards the upper free end of handle portion H. The sliding action continues until holding device 10 tightly grips the handle portion H. Once installation of holding device 10 has been completed an individual can hold and maneuver utensil U by grasping holding device 10. To remove holding device 10 from utensil U, the foregoing steps are performed in reverse order.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A utensil holding device attachable to a handle portion of a utensil to facilitate maneuvering of the utensil, the utensil holding device comprising:

handle means adapted for grasping the utensil holding device, said handle means including:
   a convex outer surface, and
   a concave inner surface forming a cavity for receiving the handle portion of the utensil; and attachment means located at one end of the handle means and adapted for engaging the utensil holding device with the utensil, said attachment means including:
   a channel extending axially through the attachment means to the cavity for receiving the handle portion of the utensil, wherein said channel tapers from a first end of the channel to a second end of the channel located at said cavity, and
   a slot extending generally parallel to said channel and is tapered from an exterior surface of said attachment means to the channel to provide access thereto by the handle portion of the utensil.

2. A utensil holding device according to claim 1, wherein said handle means has a width greater than the width of the handle portion of the utensil.

3. A utensil holding device according to claim 1, wherein said utensil includes at least one of: a spoon and a fork.

4. A utensil holding device according to claim 1, wherein said utensil holding device is formed of thermoplasticelastomer (TPE).

* * * * *